United States Patent [19]
Haavisto

[11] Patent Number: 5,872,877
[45] Date of Patent: Feb. 16, 1999

[54] PASSIVE RESONANT OPTICAL MICROFABRICATED INERTIAL SENSOR AND METHOD USING SAME

[75] Inventor: John R. Haavisto, Marshfield Hill, Mass.

[73] Assignee: IntelliSense Corporation, Wilmington, Mass.

[21] Appl. No.: 800,653

[22] Filed: Feb. 4, 1997

[51] Int. Cl.⁶ .............................. G02B 6/26; G01B 9/02
[52] U.S. Cl. ................ 385/15; 385/12; 385/14; 385/42; 385/129; 385/130; 356/350
[58] Field of Search ................... 385/12, 13, 15, 385/129, 14, 130, 131, 39, 42; 356/350; 372/92, 94, 98

[56] References Cited

U.S. PATENT DOCUMENTS

| | | |
|---|---|---|
| 4,135,822 | 1/1979 | Ezekiel . |
| 4,326,803 | 4/1982 | Lawrence et al. . |
| 4,630,886 | 12/1986 | Haavisto . |
| 4,658,401 | 4/1987 | Segre et al . |
| 4,661,964 | 4/1987 | Haavisto . |
| 4,674,881 | 6/1987 | Lawrence . |
| 5,022,760 | 6/1991 | Lawrence et al. . |
| 5,123,027 | 6/1992 | Lawrence et al. . |
| 5,229,831 | 7/1993 | Carroll et al. ........................... 356/350 |
| 5,325,174 | 6/1994 | Danko ..................................... 356/350 |
| 5,327,215 | 7/1994 | Bernard et al. ......................... 356/350 |
| 5,384,637 | 1/1995 | Sanders et al. . |
| 5,627,644 | 5/1997 | Sanders ................................... 352/350 |

*Primary Examiner*—Brian Healy
*Attorney, Agent, or Firm*—Kirkpatrick & Lockhart LLP

[57] ABSTRACT

Simple passive ring resonator laser gyro. The gyro eliminates the need to separately control the frequency of the two oppositely directed beams. The gyro eliminates the need to alternatively switch the light source at fixed steps of time between the two frequencies at which each of the oppositely directed beams are in resonance. A semiconductor laser diode, the beam source, is locked to one signal and its output is coupled into a closed geometric shape waveguide resonator and then sampled by detectors. The laser beam is maintained at the resonant frequency of one of the directions of propagation in the waveguide resonator. This frequency is determined by a process of modulating and demodulating the beam with a substantially sinusoidal waveform. As such the gyro need not actively switch the laser between the resonant frequencies of both of the directions of propagation in the waveguide resonator. This results in a gyro that has less noise, improved signal quality, and reduced complexity and cost of fabrication.

27 Claims, 5 Drawing Sheets

PASSIVE RESONANT OPTICAL MICROFABRICATED INERTIAL SENSOR AND METHOD USING SAME

TECHNICAL FIELD OF THE INVENTION

The present invention relates to inertial instruments and more particularly to open-loop passive-ring laser gyros.

BACKGROUND OF THE INVENTION

In general, laser gyros or laser rate sensors operate under principle described by the Sagnac Effect by arranging for a laser to introduce two oppositely directed beams of light into a ring resonator. In a passive laser gyro, the light source is external to the ring resonator. In an active laser gyro, the light source is contained within the ring resonator. For reasons well described in the art, passive laser gyros are desirable over active laser gyros. Due to this fact, the operation of laser gyros will be described herein in terms of passive laser gyros.

The frequency of the laser is initially tuned so that an integral number of wavelengths fit within the length of the ring resonator. When the ring is at rest, such a frequency will cause the ring to be in resonance. When the ring goes through rotation about the axis perpendicular to the plane in which it lies, the apparent path length for the beam traveling around the ring in the direction of the rotation will become shorter than that of the beam traveling around the ring opposite direction of rotation. As the apparent path lengths of the rings being traveled by each of the two beams changes, the resonant frequency for each of the two beams will also change. By altering the frequency the beams, the rings being traveled by that beams can be brought back into resonance. The difference between the initial frequency required to establish resonance when the ring was at rest and the frequency required to re-establish resonance of the ring being traveled by one of the beams when the ring is being rotated, is directly related to the rate of rotation of the ring about the axis that is perpendicular to the plane in which it lies. Accordingly the rate of rotation of the ring can be derived from accurately measuring this difference in frequency.

The means currently described in the art for measuring the change in resonant frequency in such devices are known as closed loop laser gyros and open loop laser gyros. In the closed loop variety, the frequencies of both of the oppositely directed beams are independently controlled to maintain the rings being traveled by both of the beams in resonance concurrently. In the open loop variety, the frequency of the light source itself is controlled to maintain only the ring being traveled by one of the beams in resonance at any one time.

Closed loop laser gyros, and in particular U.S. Pat. No. 4,135,822 to Ezekiel and U.S. Pat. No. 4,326,803 to Lawrence, operate by concurrently altering the frequency of both of the beams being introduced into the ring resonator to maintain both of the counter-propagating beams in resonance. As such a frequency shifter is placed in the path of each of the beams to alter the frequency of each beam before it enters the ring. Each frequency shifter is responsive to the changes in resonant frequency produced by the changes in apparent path length of each of the beams. Each frequency shifter acts to bring the frequency of the beam passing through it into resonance for the apparent path length of the ring that it is traversing. The structure of the closed loop gyro necessary to maintain the frequency of each of the counter-propagating beams on resonance decreases the signal-to-noise ration, resulting in decreased signal quality. The necessary structure also adds to both the cost and complexity of the gyro. The increases in cost and complexity effectively foreclose the use of a closed loop laser gyro in many applications where such a device could otherwise be employed.

Open loop gyros, such as U.S. Pat. No. 4,674,881 to Lawrence, operate by stepping the frequency of the laser across the resonance frequency of the ring resonator in steps of a fixed time length. The differences in the intensity of light in one of the counter-propagating beams during the steps is detected. Electronics responsive to these differences are used to alter the level of the steps to drive the difference during the steps to zero. The intensity of light in the other counter propagating beam is then detected during the steps and the difference in intensity for the beam during the steps is determined. This difference is indicative of the rate of rotation of the ring. Open loop gyros, such as U.S. Pat. No. 4,661,964 to Haavisto, switch the frequency of the laser at a fixed rate of time between two values corresponding to the resonant frequencies for the apparent path lengths being traversed by each the two oppositely directed beams. The difference in these two values is then used to derive the rate of rotation of the ring. The structure necessary to accomplish the open loop system and more specifically the structure necessary to vary the frequency of the laser in fixed time steps between two corresponding frequencies results in an increase in cost and complexity that forecloses the use of existing open loop sensors in a number of applications where they would otherwise be suitable for use.

It is therefore an objective of the present invention to provide a simplified laser gyro without the need for the elements in the structure such as separate frequency shifting devices.

Yet another objective of the present invention is to provide a simplified laser gyro without the need for the elements in the structure that provide for biasing of the light source in fixed time intervals between two frequencies.

Yet another objective of the present invention is to provide a simplified laser gyro that is less complex to manufacture, and that may be produced at a reduced overall cost Yet another objective of the present invention is to provide a simplified laser gyro that is less complex to manufacture, with a greater overall reliability Yet another objective of the present invention is to provide a simplified laser gyro having less noise and therefore better signal quality.

Additional objectives, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations pointed out in the claims.

Still other objects and advantages of the invention will become readily apparent to those skilled in this art from the following detailed description of the preferred embodiment, wherein we have shown and described only the preferred embodiment of the invention. As will be realized, the invention is capable of other and different embodiments, and its several details are capable of modifications in various obvious aspects, all without departing from the invention. Accordingly, the drawing and description are to be regarded as illustrative in nature, and not as restrictive.

SUMMARY OF THE OF INVENTION

According to the present invention, the foregoing and other objects and advantages are best obtained by the passive resonant optical microfabricated inertial sensor disclosed herein.

A passive resonant optical microfabricated inertial sensor according to the present invention includes a laser and a resonator. The resonator is formed in any closed geometric shape, however a circle or an ellipse are most commonly used. Apparatus is provided to evanescently couple from the laser into the ring resonator such that they are traveling in opposite directions within the ring. Further apparatus is provided to individually detect and monitor the output of intensity of each of the oppositely directed beams within the ring. A resonance tracking servo device that is adapted to control the frequency of the beam produced by the laser according to changes in intensity of the oppositely directed beams is also provided.

When the ring is not experiencing rotation, the laser is tuned such that the frequency the oppositely directed beams are held to the resonant frequency of the ring. As the ring resonator goes through rotation about the axis perpendicular to the plane in which it lies, the apparent length of the ring around which each of the oppositely directed beams is traveling will change. Accordingly the resonant frequency for the ring of each of these apparent lengths will also change.

Without changing the frequency of the oppositely directed beams to account for the change in resonant frequency due to the apparent change in path length, the change in resonant frequency will result in a drop in intensity in the oppositely directed beams. This drop is detected by the output detectors. With the addition of a tracking beam having a periodic wave form into the beam from the laser, the detectors are able to use the resultant coincident signal from the superimposed beams to determine the extent of the change in the resonant frequency for each of the apparent path lengths. The signal from the output detectors is used by the resonance tracking servo to accordingly adjust the output of the laser such that one of the counter propagating beams is locked to the new resonant frequency of its apparent path length.

In one alternative embodiment the resonance tracking servo locks to the signal from a single output detector. In another alternative embodiment the resonance tracking servo locks to sum of the signal from both of the output detectors. In the former of these alternative embodiments the resonance tracking servo operates to adjust the laser such that the frequency of the beam produced by the laser is at the resonant frequency of the apparent path length of one of the oppositely directed beams in the ring resonator. In the latter embodiment, the resonance tracking servo operates to adjust the laser such that the frequency of the beam produced by the laser is at the mean of the two resonant frequency of the oppositely directed beams. In both cases, the rate of rotation of the ring is then determined based on the difference in the signals received from the two output detectors.

BRIEF DESCRIPTION OF DRAWINGS

The foregoing summary, as well as the following detailed description of a preferred embodiment of the invention, will be better understood when read in conjunction with the appended drawings. For purposes of illustrating the invention, there is shown in the drawings an embodiment which is presently preferred. It should be understood, however, that the invention is not limited to the precise arrangement and instrumentality shown. In the drawings.

DETAILED DESCRIPTION OF THE PREFERRED EMBODIMENT

Figure 4:
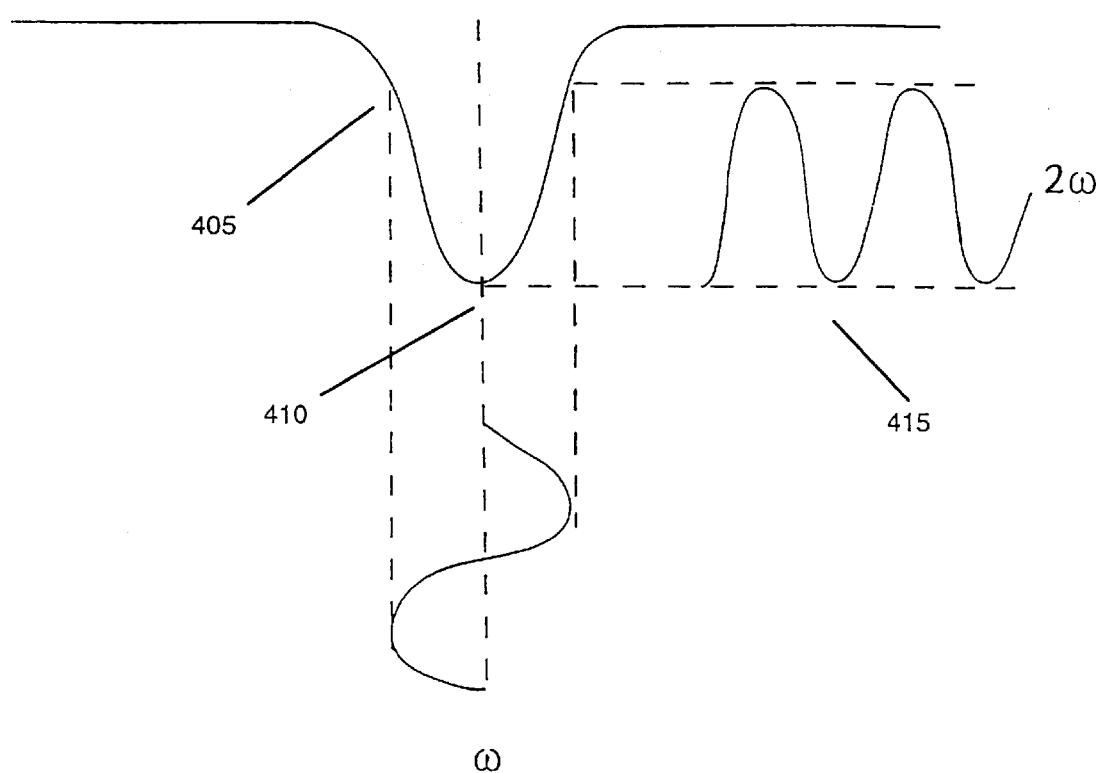
FIG. 4 is a graphical illustration of the modulated beam coincident with the resonator resonance frequency and of the output of the detector due to modulation across the resonance frequency in the present invention.
Figure 5:
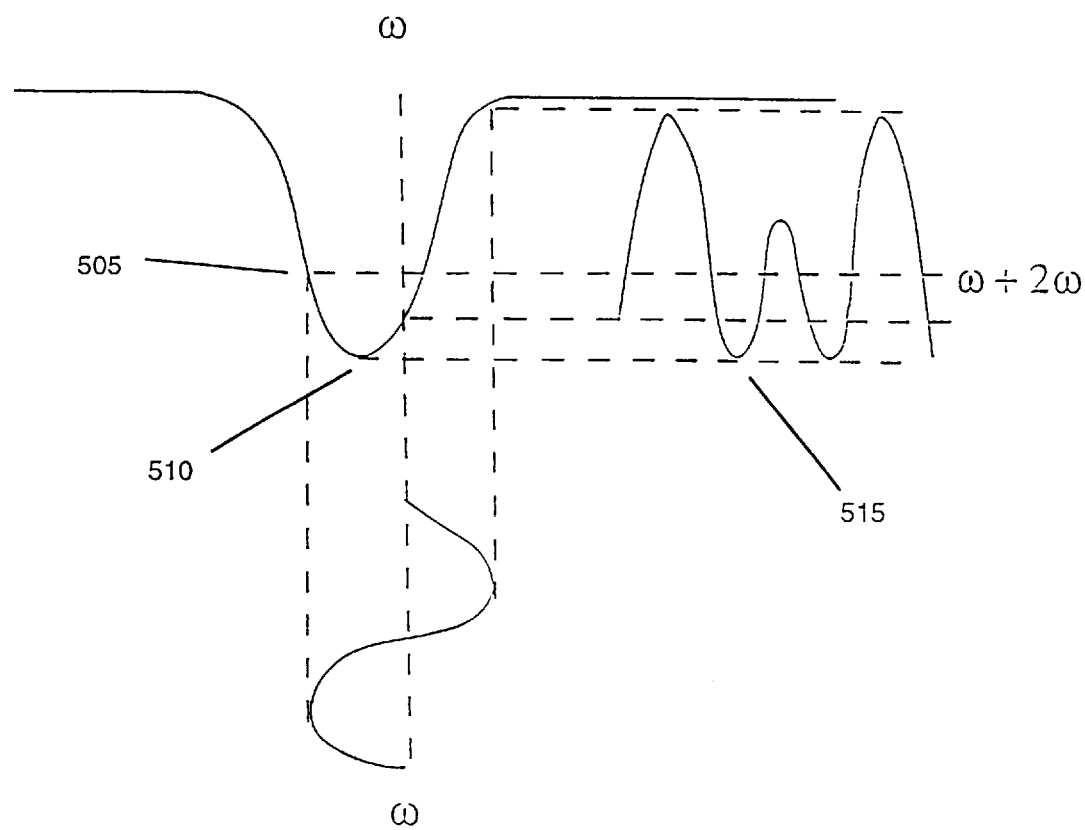
FIG. 5 is a graphical illustration of the modulation beam not coincident with the resonator resonance frequency and of the output of the detector due to modulation across resonance in the present invention.

Reference will now be made in detail to the present preferred embodiment of the invention, an example of which is illustrated in the accompanying drawings. Referring now to the drawings, wherein similar reference characters designate corresponding parts throughout the several views the theory of operation of laser gyros disclosed and claimed herein will be discussed first with reference to FIGS. 1–5. The intensity of light within a ring resonator 19 in FIG. 1 depends on the light frequency with respect to the resonant frequency of the resonator 19, $f_0$, and the line width gamma ($\Gamma$) of the resonator. As shown in FIGS. 4 and 5, the maximum (or minimum) intensity $l_0$ occurs when the frequency of light traveling in the resonator 19 has a frequency of $f_0$. As the frequency varies away from the resonant frequency $f_0$, the intensity drops off rather steeply. In particular, near resonance, the relationship between the intensity in the output 20 and an input intensity is approximated by the formula:

$$I_{out} = \frac{I_{in}}{1 + 4/\Gamma^2(f-f_0)^2}$$

Figure 1:
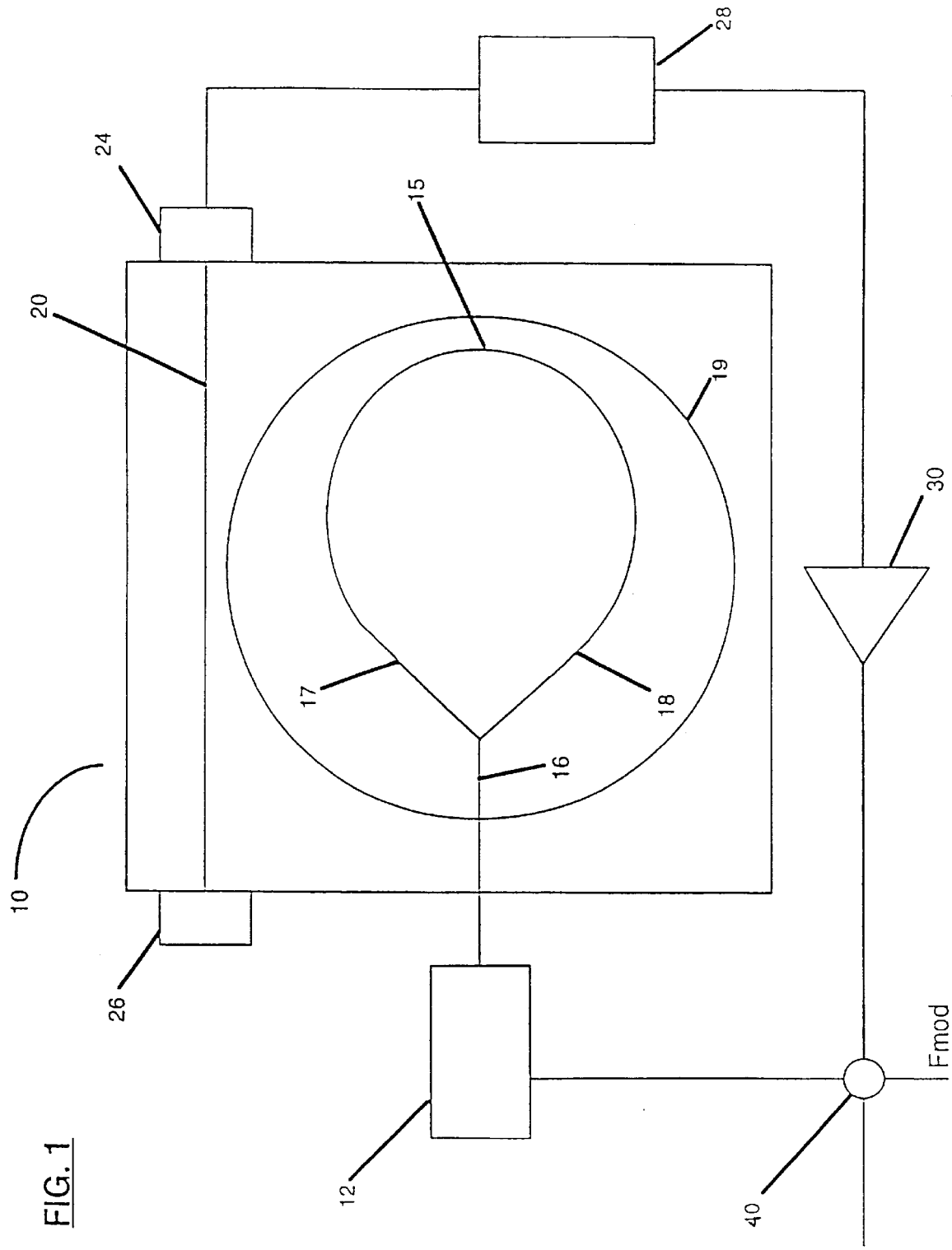
FIG. 1 is a schematic of an integrated design of the invention

Gamma ($\Gamma$) is the line width, the width of the curve in FIG. 1 at an intensity of $l=l_0/2$. The derivative of l with frequency is given by $$\frac{dI_{out}}{df} = -\frac{8}{\Gamma^2} \frac{(f-f_0)I_{in}}{(1+4/\Gamma^2(f-f_0)^2)^2}$$

The maximum slope is at the ¾ power point where $$\left|\frac{dI_{out}}{df}\right|_{\frac{3}{4}I_0} = \left(\frac{3\sqrt{3}}{4\Gamma}\right)I_{in}$$

Thus, at the ¾ power point where the slope is maximum, small frequency changes result in large changes in the intensity of light in waveguide 20. This sensitivity of intensity to small changes in resonant frequency can be utilized to make a open loop gyro.

In method by which the present invention detects these changes in resonant frequency and employs them to arrive at the rate of rotation of the ring resonator about an axis perpendicular to its plane is based on a system of synchronous modulation and demodulation. In FIGS. 4 and 5, the frequency of the laser is modulated at a reference modulation frequency above the level of ambient noise but well below the resonator line width frequency. The modulation frequency shown in FIGS. 4 and 5 is 20 kHZ. Alternatively each of the oppositely directed beams may be modulated individually at unique frequencies. The modulation itself is ideally accomplished by either directly, by modulating the current running to the laser, or indirectly, by means of a thermal modulator acting on the beam from the laser.

As in FIG. 4, when the laser center frequency 405 is coincident with the resonance frequency of the resonator 410, the modulation is centered around the minimum of the resonance dip. The output signal of the detector due to the modulation across the resonator resonance frequency 415 is a pure sinusoid at twice the modulation frequency. When the signal from the detectors is demodulated at the modulation frequency, there is zero signal resulting.

As in FIG. 5 when the laser center frequency 505 is offset from the resonance frequency of the resonator 510, due for example to a Sagnac induced frequency shift, the output signal of the detectors pick up any oscillations at the modulation frequency 515. When the signal from one of the detectors is demodulated at the modulation frequency, there is zero signal resulting. When the signal from the other of the detectors is demodulated, a dc signal is output. This dc signal is proportional to the size of the first harmonic. The voltage of this dc signal is negative or positive according to whether the detector signal is in or out of phase with the reference modulation frequency. Since the amplitude and phase of the detected frequency are proportional to the amount and direction of offset from the resonator resonance frequency, the voltage is a direct measure of the offset between the laser frequency and the resonator resonance frequency in that direction.

Additionally, if the signal from the other detector is demodulated at twice the modulation frequency (first harmonic), the result is proportional to the total intensity of the beam. This signal can be used for purposes of normalization and detection of output intensity. Alternatively, beam intensity can be determined directly from a detector that directly monitors the intensity of the beam. If used together, the first harmonic and the signal from this detector be used to reduce error in the measurement of total beam intensity. If the signal is demodulated at three times the modulation frequency (second harmonic), the resulting is also proportional to the angular rate and thus can be used to reduce error and yield a more accurate measurement of angular rate.

Thus in the present invention, the signal from one of the oppositely directed beams (the signal from one of the detectors) is used to tune the resonance frequency of the laser to that direction. The signal from the other of the oppositely directed beams (from the other of the detectors) is thus a direct measure of the Sagnac induced frequency shift, is thereby proportional to rate of rotation, and is used as an output. In the present approach the signal is linear over the range of practical interest, thus allowing for the mathematical viability of this method of determining rate of rotation. In alternative embodiments, the difference of the signals from each of the oppositely directed beams may be used to arrive at the Sagnac induced frequency shift while the sum of the signals from the beams may be used for to tune the resonance frequency of the laser.

Figure 2:
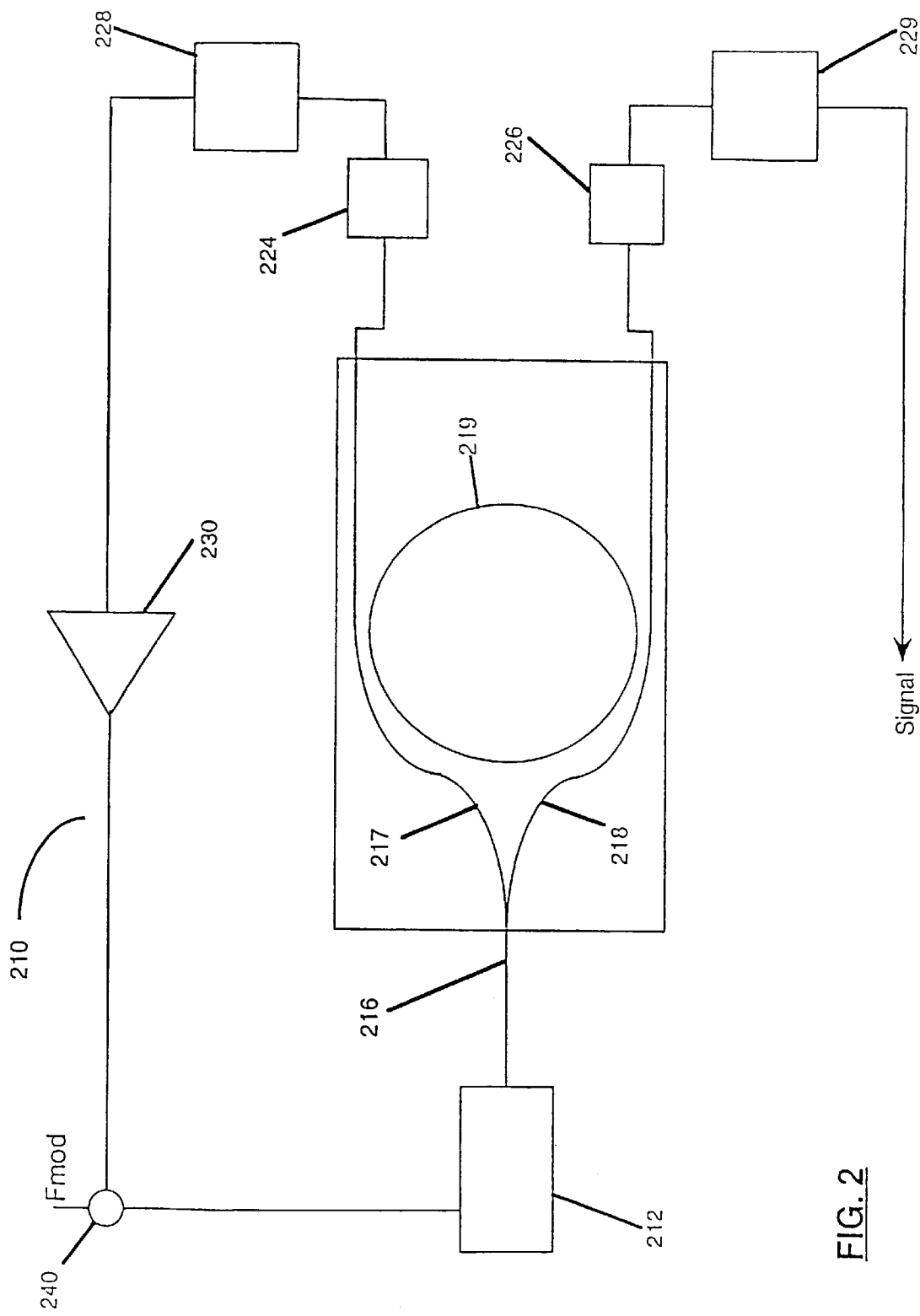
FIG. 2 is a schematic of another embodiment of an integrated design of the invention.
Figure 3:
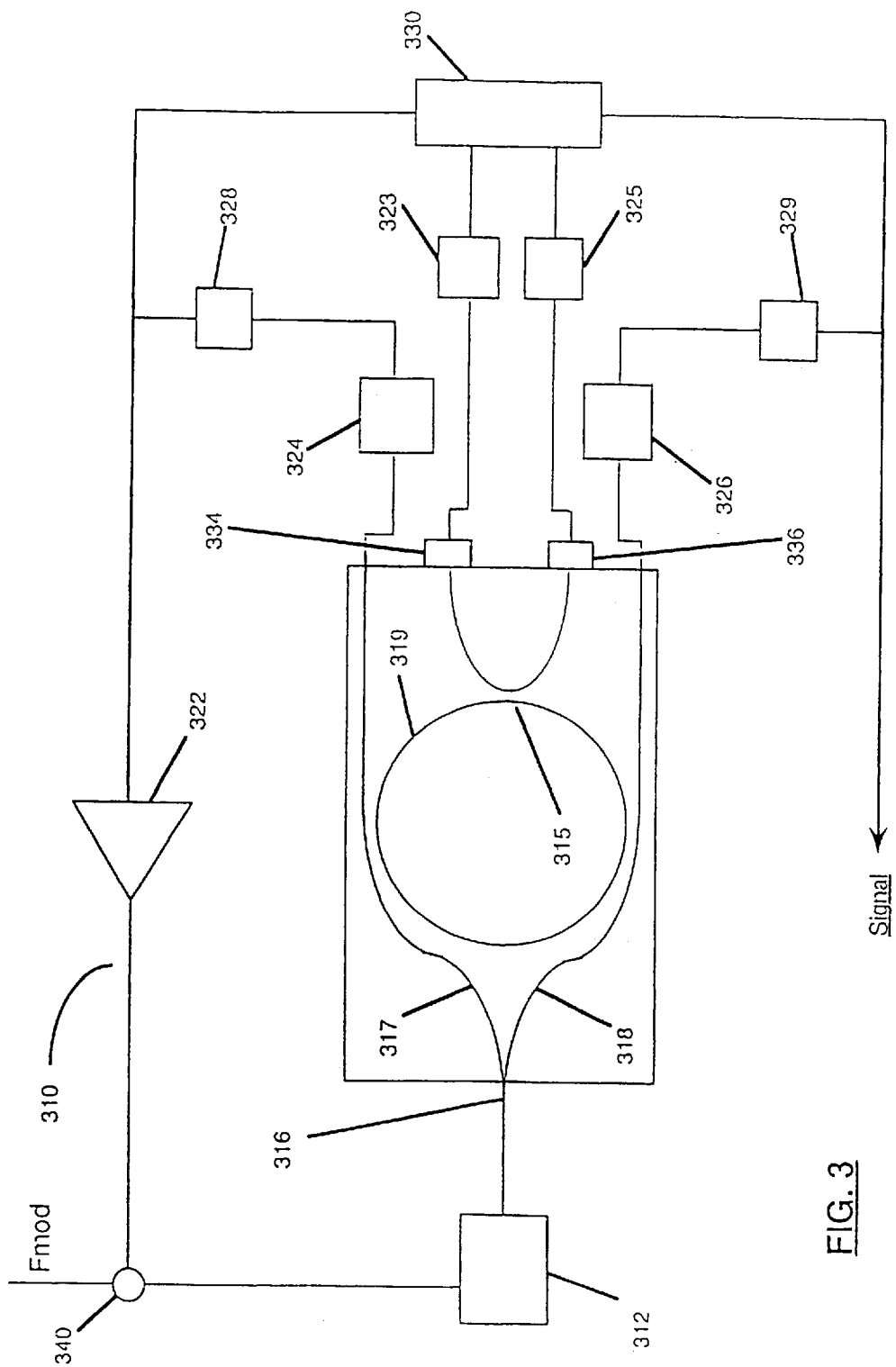
FIG. 3 is a perspective schematic of yet another embodiment of an integrated design of the invention.

Laser gyros that show preferred embodiments of the present invention are shown in FIGS. 1–3. In FIG. 1 an open loop laser gyro is shown having the design of the present invention at 10. The operation of the gyro in FIG. 1 can best be thought of as a "direct" or transmission gyro. The gyro 10 includes a semiconductor laser diode 12 which produces monochromatic laser light. The laser 12 is preferably a gallium aluminum arsenide diode laser. Output from the laser 12 passes into a branching waveguide 16. Approximately half of the light energy in the branching waveguide 16 will be directed into each of the branches of the waveguide 17 and 18. Because of the equal division of the light energy, the waveguide branches 17 and 18 may be though to be coupled by a 3 dB coupler. Light energy traveling in waveguide branch 17 is coupled by an evanescent coupling mechanism 15 into ring waveguide resonator 19. This light energy will propagate in a clockwise direction around ring waveguide resonator 19. Light energy traveling in waveguide branch 18 is coupled by the same evanescent coupling mechanism 15 into ring waveguide resonator 19. This light energy will propagate in a counterclockwise direction around ring waveguide resonator 19. Light energy from the oppositely directed clockwise and counterclockwise beams in the ring waveguide are transmitted into the output waveguide 20. When the resonance condition exists, the light energy transmitted into the output waveguide 20 is at a maximum. As the resonant frequency shifts, the resonance condition is lost and the light transmitted into the output waveguide 20 falls off sharply as shown in FIGS. 4 and 5.

The output of the clockwise directed beam is monitored by detector 24. The output of the counterclockwise directed beam is monitored by detector 26. The output of the detectors runs through a signal processor 28 where the signal processed by the method described above. A servo 30 is respondent to the output from the signal processor 28. The output of the servo 30 is compared with the reference frequency $F_{mod}$ at the bias 40 using the method described herein and the result is used to set the current input to the semiconductor laser diode 12 so that the light energy produced by the laser 12 has a frequency equal to the resonant frequency of one of the apparent paths being traveled by one of the oppositely directed beams of light in the ring resonator waveguide 19.

The laser gyro in FIG. 1 is considered "direct" in that it uses the transmitted Fabry-Perot signals detected at detectors 24 and 26, which rise to a maximum at resonance as shown in FIGS. 4 and 5. When the signals at detectors 24 and 26 rise to a maximum at resonance, the light intensity in the input couplers 17 and 18 is at a minimum since substantially all of the light energy is in the ring waveguide resonator 19.

FIG. 2 shows another embodiment of the open loop laser gyroscope. The mode of operation of the laser gyro depicted in FIG. 2 can be thought of as an "indirect" or absorption gyro. As with FIG. 1, the laser gyro 210 includes a laser diode 212, a ring waveguide resonator 219, input couplers 217 and 218, and output detectors 224 and 226. The gyro will operate in a manner similar to the gyro depicted in FIG. 1. The laser diode 212 is adapted to introduce laser light energy into the branching waveguide 216. This energy is divided in half, with half going to each the input coupler 217 and the input coupler 218. Output detectors 224 and 226 are connected to monitor the output of each input coupler 217 and 218 respectively. The detectors 224 and 226 are capable of detecting the intensity of the light energy in the waveguides 217 and 218. The signal from the detector 224, which is representative of the intensity of the clockwise traveling beam in ring waveguide resonator 219, passes through signal processor 228 where the signal is processed according to the method described previously. The output of detector 226, which is representative of the intensity of the counterclockwise traveling beam in ring waveguide resonator 219, passes though demodulator 229 where the signal is demodulated. The output from signal processor 228 forms the input of servo 230. The output of the servo is compared with the reference frequency $F_{mod}$ at a bias 240. The result is used to set the current input to the semiconductor laser diode 212 so that the frequency of light energy produced by the laser is at the resonant frequency of the apparent path being traveled by the clockwise beam in the resonator. According to the method of described previously, the signal from signal processor 229 is then used to determine the rate of rotation of the instrument. It is understood that the choice of detector 224 to determine the frequency of the laser and of detector 226 to derive the rate of rotation is purely arbitrary. That is, the embodiment in FIG. 2 could be modified so that the signal from detector 226 (that is the signal from the counter clockwise traveling beam) is used to determine the frequency of the laser and the signal from detector 224 (that is the signal from the clockwise traveling beam) is used to determine the rate of rotation.

The laser gyro in FIG. 2 is considered "indirect" in that it uses the absorbed Fabry-Perot signals at detectors 224 and 226 which fall to a minimum at resonance as shown in FIGS. 4 and 5. The signals at detectors 224 and 226 fall to a minimum at resonance due to the light intensity in the input couplers 217 and 218 being at a minimum since substantially all of the light energy is in the ring waveguide resonator 219.

FIG. 3 illustrates an embodiment of the invention which combines the "direct" and the "indirect" gyros shown in FIGS. 1 and 2. As such both the absorbed and transmitted signals are monitored. Since both the "direct" and "indirect" signals occur independently, they may be combined to improve the sensitivity of the laser gyro 310. As will be seen, this embodiment eliminates the need for a detector for sensing the laser output for normalizing purposes. This embodiment also eliminates any spurious rate signals resulting from differential intensity fluctuations. In an optional embodiment, the laser gyro 310 includes a laser diode 312 mounted on a thermoelectric device to maintain the temperature of the laser at a constant. The laser diode 312 emits light energy which propagates into branching waveguide 316. The light energy is then split equally into input couplers 317 and 318. The input couplers 317 and 318 are coupled by evanescent coupler to transfer light energy to ring waveguide resonator 319. The signals from input couplers 317 and 318 form the inputs to detectors 324 and 326 respectively. The signals from detectors 324 and 326 are then demodulated at demodulators 328 and 329 respectively. The demodulated signals are then processed according to the method described previously. Light energy from the oppositely directed beams traveling in waveguide resonator 319 is coupled by an evanescent coupling mechanism 315 into output coupler 320. The clockwise propagating beam is thus monitored by detector 334 and the counterclockwise beam is monitored by detector 336. The signals from detectors 334 and 336 are demodulated by demodulators 323 and 325 respectively. The demodulated signals from demodulators 323 and 325 are then processed according to the method described previously at signal processor 330.

Thus, the invention provides a practical and useful device which may be economically manufactured, and which meets a need in the industry for simplicity and utility. Although a few exemplary embodiments of the present invention have been described in detail above, those skilled in the art will readily appreciate that many modifications are possible without materially departing from the novel teachings and advantages which are described herein. Accordingly, all such modifications are intended to be included within the scope of the present invention, as defined by the following claims.

Having hereby described the invention, what is claimed is:

1. A sensor device comprising:
    a source of coherent light;
    a beam of coherent light produced by said source of coherent light and having a signal;
    a waveguide having a closed geometric shape, a beam coupler for coupling light from said source of coherent light into said waveguide to generate two oppositely directed light beams;
    one or more beam detector; and
    a servo responsive to said one or more beam detector for adjusting the frequency of said source of coherent light to maintain one of said oppositely directed light beams on resonance within said waveguide.

2. The sensor according to claim 1, further comprising:
    a beam modulator for modulating said signal of said beam from said source of coherent light;
    a beam demodulator for demodulating said signal of said beam from said source of coherent light; and
    a signal processor respondent to the signal from said one or more beam detector.

3. The sensor according to claim 2, wherein said one or more beam detector is adapted to detect the relative intensity of the oppositely directed beams that are being transmitted by said waveguide.

4. The sensor according to claim 2, wherein said one or more beam detector is adapted to detect the relative intensity of the oppositely directed beams that are being absorbed into said waveguide.

5. The sensor according to claim 2, wherein said one or more beam detector is adapted to detect the relative intensity of the oppositely directed beams that are being both absorbed into and transmitted by said waveguide.

6. The sensor according to claim 2, wherein said one or more beam detector comprises:
    a first clockwise beam detector; and
    a first counterclockwise beam detector.

7. The sensor according to claim 6, wherein said one or more beam detector comprises:
    a second clockwise beam detector; and
    a second counterclockwise beam detector.

8. The sensor according to claim 6, wherein said servo is responsive to the signal from either said first clockwise or said first counterclockwise beam detector.

9. The sensor according to claim 6, wherein said servo is responsive to the sum of the signals from said first clockwise and first counterclockwise beam detectors.

10. The sensor according to claim 6, further comprising:
    an output calculator for generating an output signal that is representative of the angular rate of the waveguide.

11. The sensor according to claim 10, wherein said output calculator is responsive to the difference between the signals from said first clockwise and first counterclockwise beam detectors.

12. The sensor according to claim 10, wherein said output calculator is responsive to the signal from either of said first clockwise or first counterclockwise beam detectors.

13. The sensor according to claim 7, further comprising:
    an output calculator, adapted to generate an output signal that is representative of the angular rate of said waveguide wherein said output calculator is responsive to the difference between the signal from one of said first or second clockwise beam detectors and the signal from one of said first or second counterclockwise beam detectors.

14. The sensor according to claim 1, wherein said beam coupler comprises a beam splitter and at least one evanescent coupler.

15. The sensor according to claim 1, wherein said source of coherent light is a laser.

16. The sensor according to claim 1, further comprising a light source temperature regulator for maintaining said source of coherent light at a constant temperature.

17. The sensor according to claim 1, wherein the shape of said waveguide resonator is a ring.

18. The sensor according to claim 2, wherein said beam modulator is adapted to individually modulate each of said oppositely directed beams at a separate modulation frequency.

19. The sensor according to claim 2, wherein said beam modulator is adapted to individually modulate each of said oppositely directed light beams at a separate frequency of modulation.

20. The sensor according to claim 2, wherein said beam modulator comprises a thermal modulator.

21. The sensor according to claim 2, wherein said beam modulator modulates said beam of coherent light by affecting the current running to said source of coherent light.

22. The sensor according to claim 1, further comprising a light source detector adapted to directly monitor the intensity of said beam from said source of coherent light.

23. The sensor according to claim 1, further comprising, a beam isolator placed in the path of said beam produced by said source of coherent light.

24. The sensor according to claim 2, wherein said beam modulator is a sinusoidal wave form or the sum of several sinusoidal wave forms.

25. A method for determining the rotation of a body around an axis perpendicular to the plane in which the body lies comprising the steps of:

generating a beam of light energy;

modulating the signal from the beam with a substantially sinusoidal wave form;

introducing the beam into a waveguide resonator having a closed geometric form such that two oppositely directed beams of light are created within the waveguide;

demodulating the signals from each of the oppositely directed beams at the frequency of modulation or any harmonic thereof;

adjusting the frequency of the light source to maintain one of the oppositely directed beams on resonance within the waveguide; and utilizing the demodulated signal from the beam that is maintained on resonance within the waveguide to determine the angular rate of the waveguide.

26. A sensor device comprising:

a source of coherent light;

a beam of coherent light produced by said source of coherent light and having a signal;

a waveguide having a closed geometric shape;

a beam coupler for coupling light from said light source into said waveguide resonator to generate two oppositely directed light beams;

a first clockwise beam detector;

a first counterclockwise beam detector; and a servo responsive to the signal from either said first clockwise beam detector or first counterclockwise beam detector for adjusting the frequency of said light source to maintain at least one of said oppositely directed light beams on resonance within said waveguide.

27. A sensor device comprising:

a source of coherent light a beam of coherent light produced by said source of coherent light and having a signal;

a waveguide resonator having a closed geometric shape;

a beam coupler for coupling light from said light source into said waveguide resonator to generate two oppositely directed light beams;

a first clockwise beam detector;

a first counterclockwise beam detector; and a servo responsive to the signal from either said first clockwise beam detector or first counterclockwise beam detector for adjusting the frequency of said light source to maintain one of said oppositely directed light beams on resonance within said waveguide.

* * * * *